United States Patent [19]

Ozawa et al.

[11] Patent Number: 5,257,326
[45] Date of Patent: Oct. 26, 1993

[54] METHOD AND APPARATUS FOR INTERPOLATING A VIDEO SIGNAL OF A PICTURE ELEMENT WHICH HAS NOT BEEN SAMPLED AND TRANSMITTED BY AN INTERLEAVE SAMPLING OPERATION

[75] Inventors: Naoki Ozawa, Akishima; Kenji Takahashi, Tsukui; Toshiyuki Akiyama, Tokorozawa; Itaru Mimura, Sayama; Takahiro Matsumoto, Hachiouji, all of Japan

[73] Assignee: Hitachi, Ltd., Tokyo, Japan

[21] Appl. No.: 688,265

[22] Filed: Apr. 22, 1991

[30] Foreign Application Priority Data

Apr. 20, 1990 [JP] Japan ................................. 2-103000

[51] Int. Cl.⁵ ............................................. G06K 9/36
[52] U.S. Cl. ..................................... 382/54; 358/428
[58] Field of Search ............................. 382/54, 62, 67; 358/138, 428

[56] References Cited

U.S. PATENT DOCUMENTS

| | | | |
|---|---|---|---|
| 4,868,654 | 9/1989 | Juri et al. | 358/138 |
| 4,879,599 | 11/1989 | Honda | 358/138 |
| 4,912,556 | 3/1990 | Hirauchi et al. | 358/138 |
| 4,979,040 | 12/1990 | Masumoto et al. | 358/138 |

*Primary Examiner*—David K. Moore
*Attorney, Agent, or Firm*—Antonelli, Terry, Stout & Kraus

[57] ABSTRACT

A signal for a first scanning line including a picture element whose signal does not exist and a signal for a second scanning line adjacent to the first scanning line in the same field are obtained in the same period. Then, a coefficient representing the ratio of the level of the signal for the first scanning line to the level of the signal for the second scanning line is calculated. Multiplying by the coefficient the level of the signal for the second scanning line to thereby provide an interpolation signal. The interpolation signal is added to the signal for the first canning line.

6 Claims, 9 Drawing Sheets

○ FIRST FIELD
□ SECOND FIELD
● THIRD FIELD
■ FOURTH FIELD

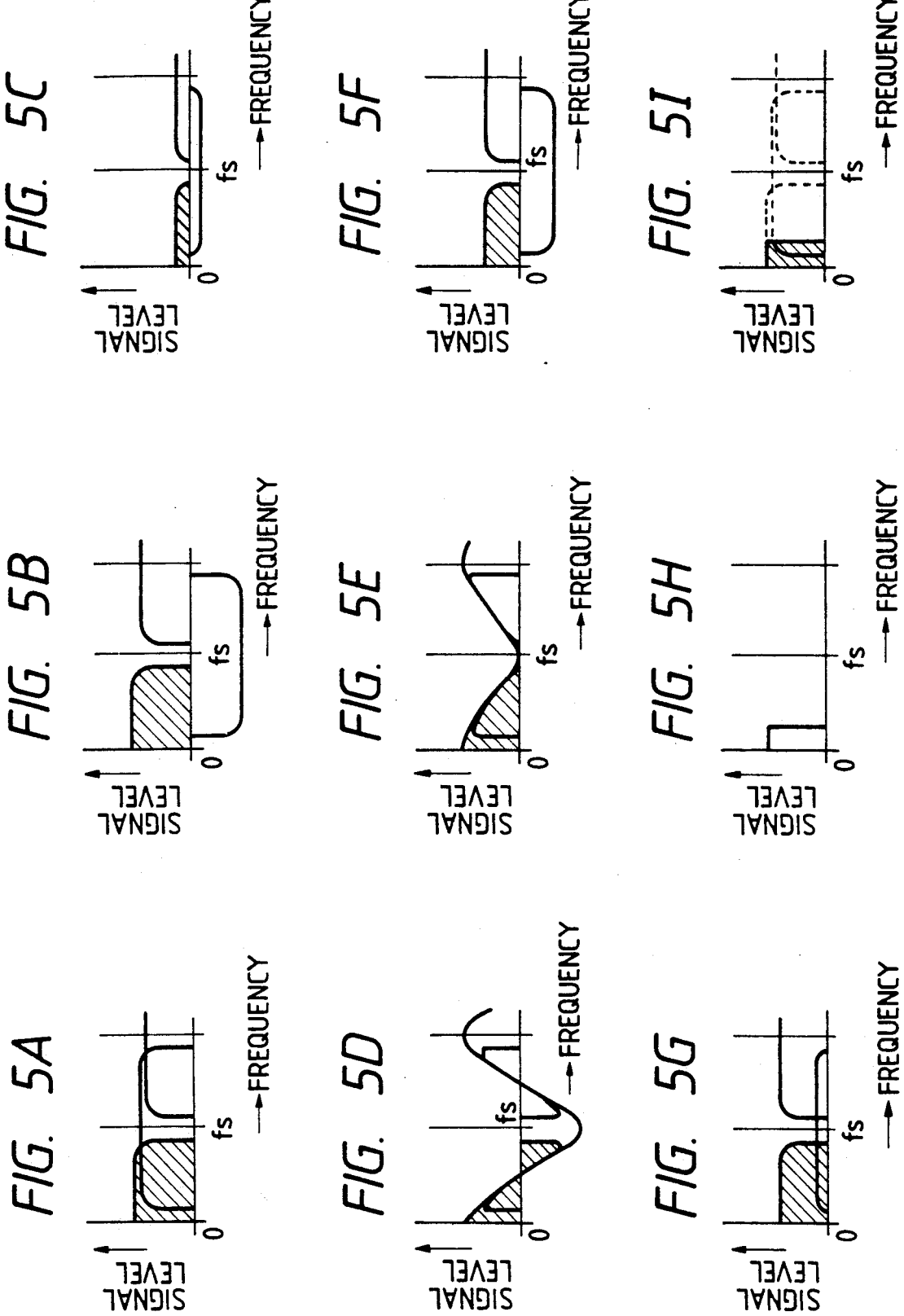

METHOD AND APPARATUS FOR INTERPOLATING A VIDEO SIGNAL OF A PICTURE ELEMENT WHICH HAS NOT BEEN SAMPLED AND TRANSMITTED BY AN INTERLEAVE SAMPLING OPERATION

BACKGROUND OF THE INVENTION

The present invention relates to a method of interpolating a video signal and apparatus for carrying out the method. The present invention is particularly concerned with a method of interpolating video signals generated and transmitted by sampling such that positions of the picture elements whose signals are sampled are interleaved in two scanning lines adjacent to each other in the same field, and with an apparatus for carrying out the method.

The development of a high definition television system is now under way which has scanning lines about twice as many as those in the current television broadcasting system and also ensures high horizontal-resolution proportionate to the number of the scanning lines. However, in high definition television, which requires transmission of a video signal with a frequency band wide enough for its high horizontal-resolution, it is difficult to carry out such transmission because of the limit of the capacity available of the current transmission means.

Therefore, a signal-band compression method such as MUSE (Multiple Sub-Nyquist Sampling Encoding) is in general use, in which sub-Nyquist sampling with interleaving in frames and fields is used. In MUSE shown in FIG. 3, a sampling point (picture element whose signal is sampled) on a scanning line is shifted along the horizontal direction by half the sampling interval from another sampling point on an adjacent scanning line in the same field. (The sampling interval is for example a space between white circles in FIG. 3.) Interlacing is performed in successive two fields, and the signals representing sampling points are interpolated in successive four fields. With video signals related to each other in the above fashion it is possible to reproduce a still picture showing high resolution thanks to the interpolation of the signals representing sampling points but only to reproduce a picture in motion showing much lower resolution because of no use of signals other than those in the present field. To achieve high resolution for pictures in motion also, such conventional methods have been proposed in Japanese Patent Application Laid-Open No. 64-29183.

In these conventional methods, pictures in motion are generally reproduced by obtaining the signal at a sampling point, which it is impossible to obtain in the present field, from the signals at sampling points adjacent to it (hereinafter referred to also as adjacent points) in the present field. For instance, the signal at point a shown in FIG. 3, which cannot be obtained in the first field, is interpolated by using the adjacent points b and c on the same scanning line or the adjacent points d and e on the scanning lines adjacent to each other in the same field.

In the above conventional methods, in the case of an object image which FIG. 4A shows has an edge portion in parallel with scanning lines, a desired signal can be obtained by interpolating the signal at point x by using the average of the levels of the preceding and subsequent signals on the same scanning line, but cannot be obtained by interpolation by using the average of the levels of the signals for the preceding and subsequent scanning lines, with the result that the reproduced picture has a failure signal as shown in FIG. 4B. By contrast, in the case of another object image which FIG. 4C shows has an edge portion perpendicular to scanning lines, a desired signal can be achieved by interpolating the signal at point y by using the average of the levels of the signals for the preceding and subsequent scanning lines, but cannot be achieved by using the average of the levels of signals on the same scanning line, with the result that the reproduced picture has a failure signal as shown in FIG. 4D.

In terms of frequency domain, the above will be described in the following way:

Let the horizontal frequency spectrum for the video signal obtained at the period of horizontal scanning of the n-th scanning line in FIG. 4A be a spectrum shown in FIG. 5A. In FIGS. 5A to 5P, fs stands for a sampling frequency in the horizontal direction for each scanning line. The hatched part of the spectrum denotes the original horizontal components of the signal for an object, and the other part of the spectrum denotes the side band components of the sampling signal which have occurred because of sampling. In general, since a frequency band of the video signal which has been subjected to the sampling is restricted under the sampling frequency fs through an appropriate low-pass filter and the sampled video signal components whose frequencies are lower than the sampling frequency are utilized for reproducing the image of the object, the lower side band components of the sampling signal may cause a failure signal in the reproduced image of the object.

Thus, the frequency spectrum for the video signal obtained at the period of horizontal scanning of the (n+1)-th scanning line in FIG. 4A is a spectrum shown FIG. 5B with the side band components at fs inverted in the phase by comparison to FIG. 5A, since sampling points on adjacent scanning lines are interleaved. Note that the spectra shown in FIGS. 5A and 5B apply when there is a high correlation between the frequency components of the video signals obtained at the n-th and (n+1)-th horizontal scanning period as they are obtained from the n-th and (n+1)-th scanning lines which are adjacent to each other in FIG. 4A. The relation between these two spectra is true of arbitrary two continuous scanning lines shown in FIG. 4C. FIG. 4A applies when the greater part of the original components of the signal for an object is a direct current component, and FIG. 4C when the frequency components of the signal for an object have a wide frequency band. On the other hand, the frequency spectrum for the video signal obtained from the (n−1)-th scanning line in FIG. 4A, as shown in FIG. 5C, represents a contraction in level of the video signal obtained from the (n+1)-th scanning line, whose frequency spectrum is shown in FIG. 5B.

Now, when the signal obtained at the n-th horizontal scanning period is interpolated by using the average of the levels of the preceding signal and the subsequent signal on the same scanning line, the interpolation signal has a frequency spectrum shown in FIG. 5D. When this signal is combined with the signal shown in FIG. 5A, the signal resulting from the interpolation has the frequency spectrum shown in FIG. 5E. In FIG. 5E, among the side band components having occurred on both sides of fs, some are removed which are caused by the low-frequency components of the signal for the object, but the others, which are high-frequency components, are left. Therefore, a desirable interpolation can be made in the case of the image of the object shown in FIG. 4A in which the greater part of the frequency components is a direct current component, but a failure signal due to side band components occurs in the case of the image of the object shown in FIG. 4C the frequency components have a wide frequency band.

When in the case of the object shown in FIG. 4A the signal obtained at the period of horizontal scanning of the n-th scanning line is interpolated by using the average of the levels of those signals for the preceding and subsequent scanning lines which have been obtained at the periods of horizontal scanning of the (n−1)-th and (n+1)-th scanning lines, the interpolation signal has a frequency spectrum shown in FIG. 5F. This interpolation signal, combined with the signal shown in FIG. 5A, changes into the interpolated signal whose spectrum is shown in FIG. 5G. As in FIG. 5G, the interpolated signal shows the original frequency components a little smaller than before interpolation and also shows a small level of the side band components on both sides of fs left all over the frequency band. Therefore, in the case of FIG. 4A, a failure signal occurs, and a desired signal cannot be obtained.

When a signal obtained at the n-th horizontal scanning period is interpolated by using the average of the levels of the preceding and subsequent signals on the same scanning line and those of the signals for the preceding and subsequent scanning lines at the (n−1)-th and (n+1)-th horizontal scanning period, the frequency spectrum is the average of the frequency spectra shown in FIGS. 5E and 5G. The failure signal occurring there is also a signal having an averaged level, resulting from the mixture of the failure signals occurring in the two cases.

As described above, the conventional means have the disadvantage that a failure signal occurs in the edge portion of the object image in the case of a picture in motion because of the processing only in the field.

SUMMARY OF THE INVENTION

An object of the present invention is, therefore, to provide a method of, while preventing failure signals from occurring in the edge portion of the object of a picture in motion, interpolating video signals generated by sampling such that the positions of the picture elements whose signals are sampled interleave each other in two scanning lines adjacent to each other in the same field, and to provide an apparatus for carrying out the method.

To achieve this object, a method of interpolating a video signal according to the present invention comprises the steps of obtaining a first signal representing a first picture element which is in a first scanning line including a picture element whose signal does not exist, and which is adjacent to the picture element whose signal does not exist; obtaining a second signal representing a second picture element which is in a second scanning line adjacent to the first scanning line in the same field, and which is adjacent to the picture element whose signal does not exist; obtaining a coefficient representing the ratio of the level of the signal including the first signal for the first scanning line to the signal including the second signal for the second scanning line; multiplying the level of the second signal by the above coefficient so that the level of the second signal is corrected; and adding the second signal whose level has been corrected to the signal for the first scanning line as a signal corresponding to the picture element whose signal does not exist.

And also to achieve the object, an apparatus for interpolating a video signal according to the present invention comprises a signal source for outputting successively, in the order of the scanning, signals for a plurality of scanning lines forming fields; a delay circuit for delaying a signal output from the signal source for one horizontal scanning period; a first low-pass filter for extracting from a signal output from the signal source its low-frequency components; a second low-pass filter for extracting from a signal output from the delay circuit its low-frequency components; a calculation circuit for calculating a coefficient representing the ratio of the level of the low-frequency components output from the first low-pass filter to that of the low-frequency components output from the second low-pass filter; a multiplication circuit for multiplying the signal output from the delay circuit by the coefficient provided by the calculation circuit; and an addition circuit for adding a signal output from the multiplication circuit to the signal output from the signal source.

DETAILED DESCRIPTION OF EMBODIMENTS

Figure 1:
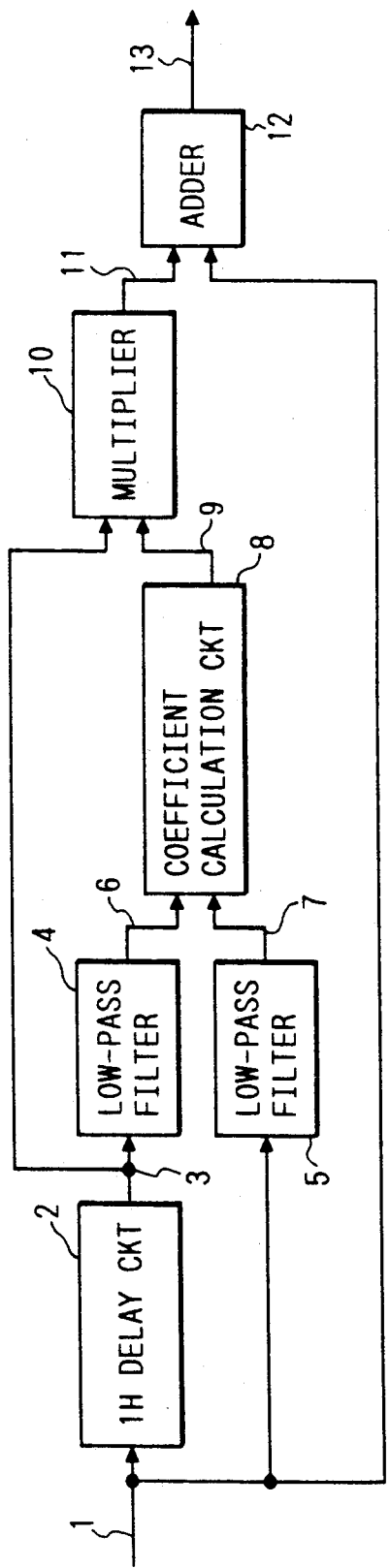
FIG. 1 is a block diagram of an apparatus for interpolating a video signal according to an embodiment of the present invention.

Referring now to FIG. 1 of the drawing, an embodiment of the present invention will be explained.

In the embodiment shown in FIG. 1, an input signal 1 is sent to a 1H delay circuit 2 whose delay time is as long as one horizontal scanning period (this period is referred to as "1H"). The circuit 2 then issues a 1H delayed signal 3. The 1H delayed signal 3 and the input signal 1 are input to low-pass filters 4 and 5 respectively so that their low-frequency components can be passed, resulting in low-frequency component signals 6 and 7 respectively. The low-frequency component signals 6 and 7 obtained this way are input to a coefficient calculation circuit 8 so as to obtain a coefficient signal 9 representing the coefficient equal to a ratio of a level of the low-frequency component signal 7 to that of the low-frequency component signal 6 (level of signal 7/level of signal 6). The coefficient signal 9 and also the 1H delayed signal 3 are input to a multiplier 10, which multiplies the level of the latter by that of the former to issue an interpolation signal 11. The interpolation signal 11 is then added to the input signal 1 by an adder 12, changed into an output signal 13.

Figure 4B:
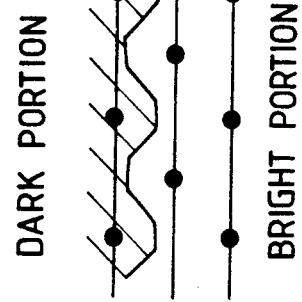
FIGS. 4A to 4D are views of two examples of the relation between the object and sampling points.
Figure 4D:
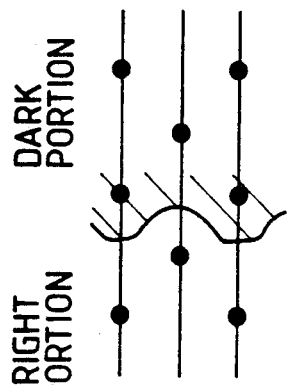
Figure 4A:
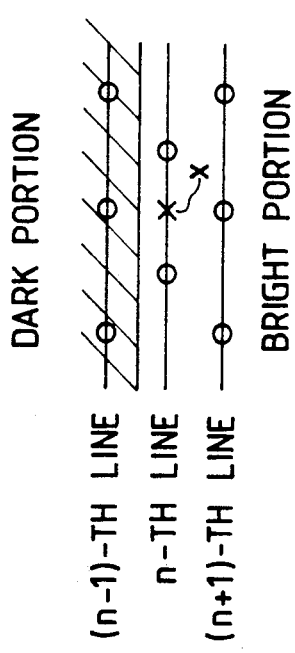
Figure 5J:
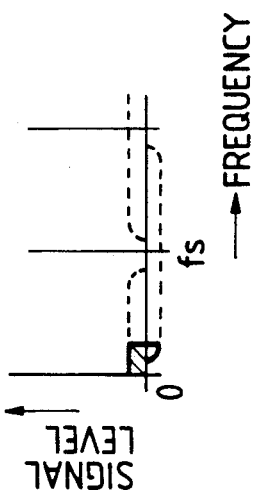
FIGS. 5A to 5P are graphs each illustrating an example of a spectrum for each video signal.

Now, in the embodiment shown in FIG. 1, let the object for the embodiment be one shown in FIG. 4A. Then, the frequency spectrum shown in FIG. 5A is obtained for the input signal 1 at the n-th horizontal scanning period. Since the 1H delayed signal 3 is obtained at the (n−1)-th horizontal scanning period, the frequency spectrum for this signal is shown in FIG. 5C. Assuming that the characteristics of the low-pass filters 4 and 5 are those shown in FIG. 5H, therefore, the frequency spectra for the low-frequency component signals 7 and 6 are those shown in FIGS. 5I and 5J respectively.

Figure 5K:
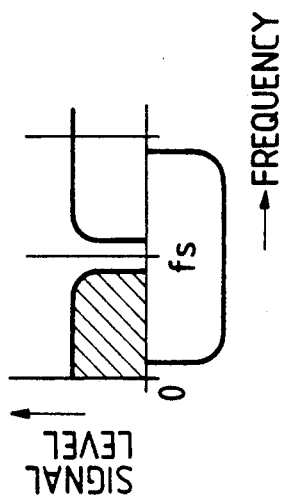
Figure 5L:
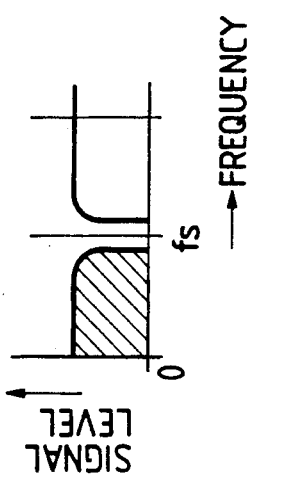

As a result of the above, after the multiplier 10 multiplies the level of the 1H delayed signal 3 by the level of the coefficient signal 9 corresponding to the ratio (level of low-frequency component signal 7/level of low-frequency component signal 6) resulting from inputting the low-frequency component signal 7 and the low-frequency component signal 6 to the coefficient calculation circuit 8, the interpolation signal 11 comes to have the frequency spectrum which is shown in FIG. 5K. Thus, the frequency spectrum for the output signal 13 obtained by inputting the input signal 1 and the interpolation signal 11 to the adder 12 is, as shown in FIG. 5L, freed from the side band components on both sides of fs with the result that no failure signal occurs to a reproduced picture.

Figure 4C:
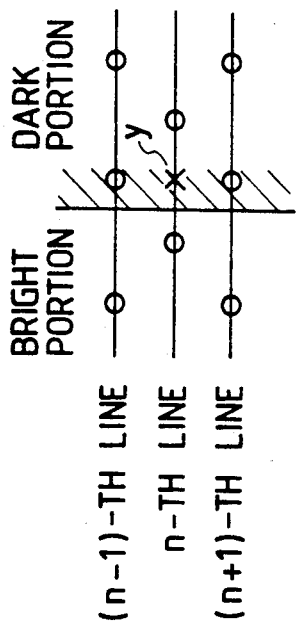
Figure 5M:
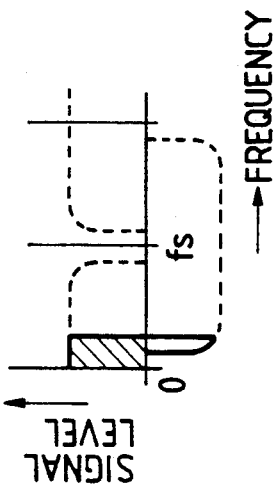
Figure 5N:
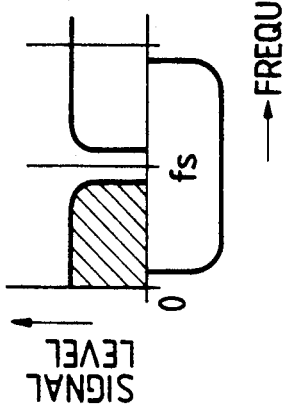
Figure 5P:
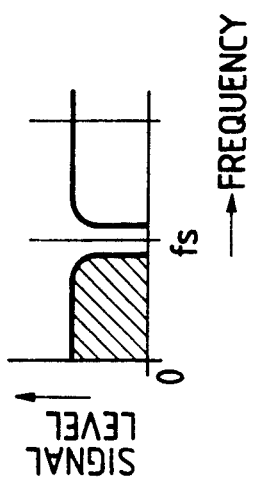

On the other hand, if the object is one shown in FIG. 4C, the frequency spectrum shown in FIG. 5B is obtained for the signal at the (n−1)-th horizontal scanning period. This is sent to the low-pass filter 6, resulting in the frequency spectrum shown in FIG. 5M for the low-frequency component signal 6. Thus, input of the low-frequency component signals 6 and 7 to the coefficient calculation circuit 8 generates the coefficient signal 9, and input of the coefficient signal 9 and the 1H delayed signal 3 to the multiplier 10 generates the interpolation signal 11 shown in FIG. 5N. Therefore, when this interpolation signal 11 is added to the input signal 1 by the adder 12, the output signal 13 is obtained which is as shown in FIG. 5P freed from the side band components on both sides of fs, so no failure signal occurs to a reproduced picture.

Figure 6:
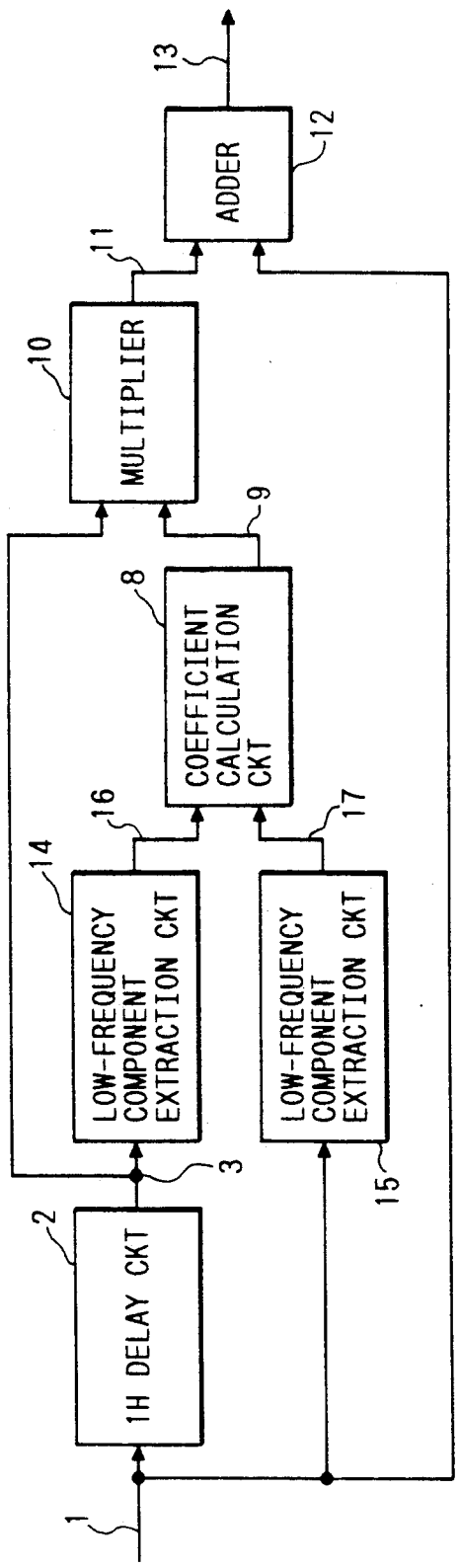
FIGS. 6 to 10 are block diagrams each showing an apparatus for interpolating a video signal according to each of different embodiments of the present invention.

As described above, in the embodiment of the present invention shown in FIG. 1, a reproduced picture without any failure signal can be obtained from an object which FIG. 4A shows has an edge portion in parallel with scanning lines and also from an object which FIG. 4C shows has an edge portion perpendicular to scanning lines, since the side band components on both sides of fs are removed in both cases. Incidentally, though in the embodiment shown in FIG. 1 the low-pass filters 4 and 5 are used to obtain low-frequency component signals from the input signal 1 and the 1H delayed signal 3 in order to generate the coefficient signal 9, other circuits than low-pass filters may be used as long as the coefficients of low-frequency components of signals are obtained. For instance, in another embodiment shown in FIG. 6, low-frequency component extraction circuits 14 and 15 may be used to obtain the low-frequency components 16 and 17 of signals, which are then sent to the coefficient calculation circuit 8 to obtain the coefficient signal 9. Such circuits as a fast Fourier transform (FFT) circuit may be used for the low-frequency component extraction circuits 14 and 15.

Figure 7:
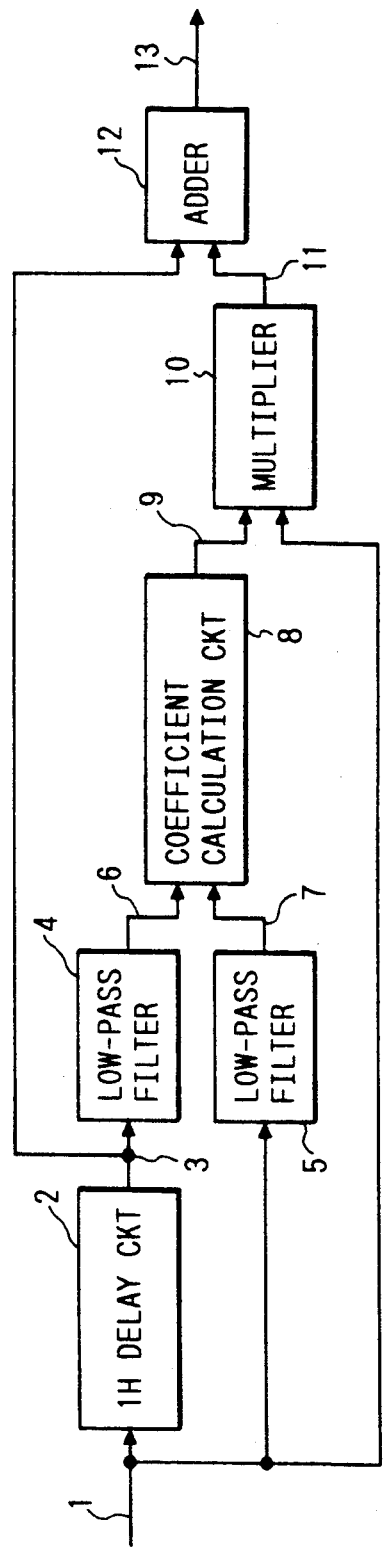

Furthermore, though in the embodiment shown in FIG. 1 the signal at the n-th horizontal scanning period is interpolated by using the signal at the (n−1)-th horizontal scanning period, it can be interpolated by using the signal at the (n+1)-th horizontal scanning period as in a third embodiment of the present invention shown in FIG. 7. In this figure, the 1H delayed signal 3 obtained by the 1H delay circuit 2 is treated as a time base signal (the signal at the n-th horizontal scanning period), and the input signal 1 sent to the circuit 2 is treated as a signal for the subsequent one horizontal scanning period (the signal at the (n+1)-th horizontal scanning period). A coefficient signal 9 output from the coefficient calculation circuit 8 represents the coefficient equal to a ratio of a level of the low-frequency component signal 6 to that of the low-frequency component signal 7 (level of signal 6/level of signal 7). Now, other composing elements operate the same way as in the embodiment shown in FIG. 1. The same effects can be taken on by both the embodiment shown in FIG. 7 in which interpolations are made by using the signal at the (n+1)-th horizontal scanning period and the embodiment shown in FIG. 1 in which interpolations are made by using the signal at the (n−1)-th horizontal scanning period. This will be obvious when the object is considered as upside down.

Figure 8:
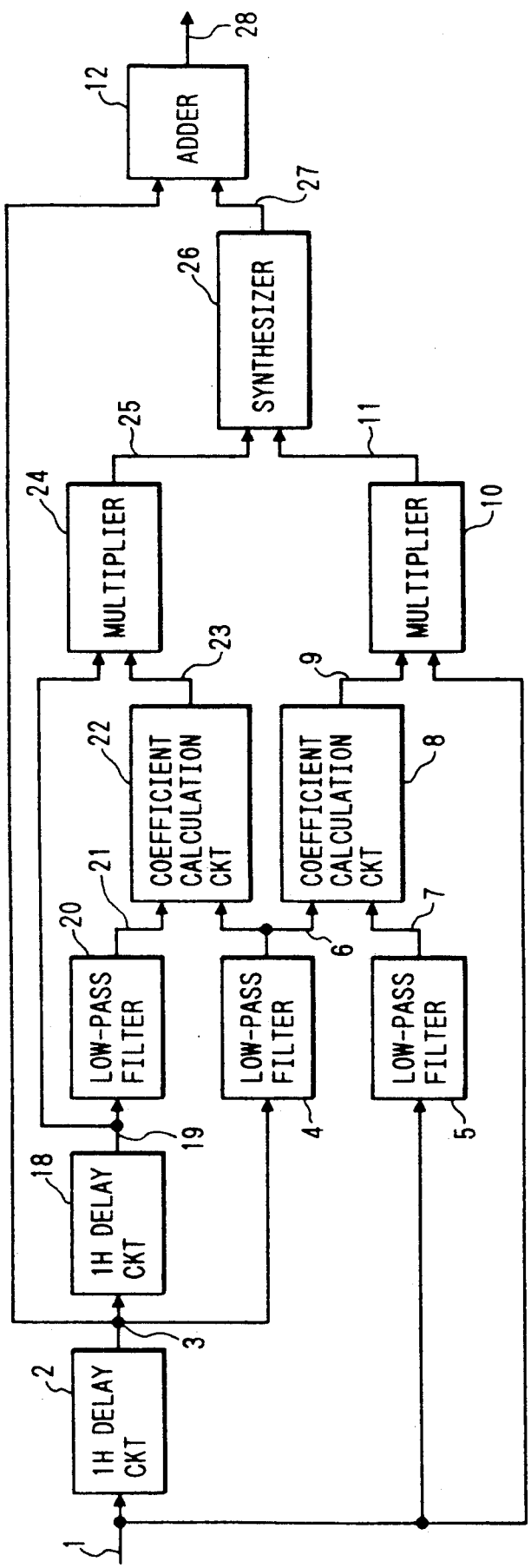

Then, as easily understood from the above, interpolations can be made by using the signal obtained at the (n−1)-th horizontal scanning period and also the signal obtained at the (n+1)-th horizontal scanning period as in a fourth embodiment shown in FIG. 8. In this embodiment of FIG. 8, the embodiment shown in FIG. 7 which is for the interpolation by using the signal obtained at the (n+1)-th horizontal scanning period is combined with the composition below which is for the interpolation by using the signal obtained at the (n−1)-th horizontal scanning period.

To be more specific, the 1H delayed signal 3 output from the 1H delay circuit 2 is sent to a delay circuit 18 whose delay time is as long as a 1H horizontal scanning period in order to obtain a 2H delayed signal 19. After the 2H delayed signal 19 is sent to a low-pass filter 20, which outputs its low-frequency components as a low-frequency component signal 21, the signal 21 is sent to a coefficient calculation circuit 22 together with the low-frequency component signal 6 which is the low-frequency components of the 1H delayed signal 3. Then, the coefficient calculation circuit 22 outputs a coefficient signal 23 representing the coefficient equal to a ratio of the level of the low-frequency component signal 6 to that of the low-frequency component signal 21 (level of signal 6/level of signal 21). This signal 23 is sent to a multiplier 24 together with the 2H delayed signal 19 in order to obtain an interpolation signal 25, which is then sent to a synthesizer 26 together with the interpolation signal 11 in order to obtain a synthesized interpolation signal 27. This synthesized interpolation signal 27 is added to the 1H delayed signal 3 by the adder 12 in order to obtain an output signal 28.

Figure 9:
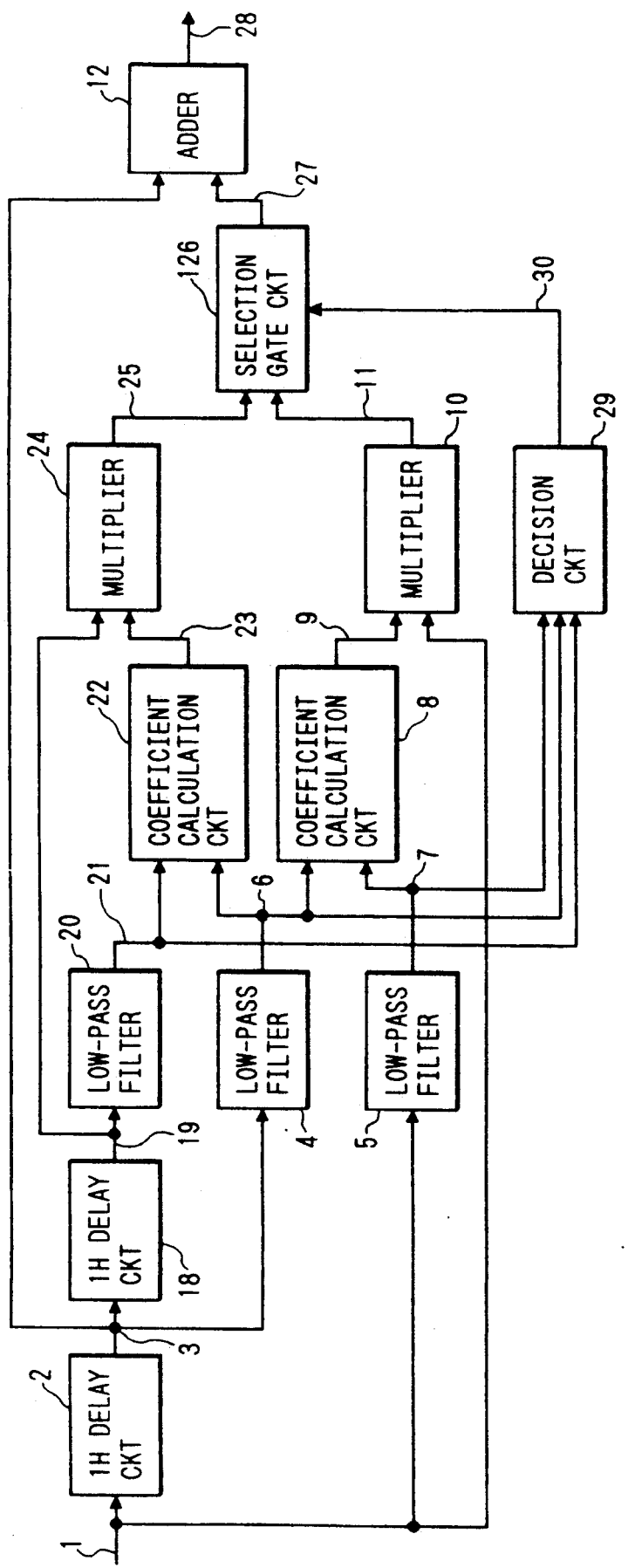

For the synthesizer 26, a circuit may be used which outputs a signal representing the average of the levels of the interpolation signals 25 and 11. As in a fifth embodiment shown in FIG. 9, a selection gate circuit 126 may also be used which selects between the interpolation signals 25 and 11 according to a decision signal 30 obtained by sending the low-frequency component signals 6, 7 and 21 to a decision circuit 29 and passes the selected signal. Or according to the level of the decision signal 30 coefficients for the addition of the interpolation signals 25 and 11 may be varied. The selection between the interpolation signals 25 and 11 may also be made according as the signal 25 or 11 corresponds to one of the low-frequency component signals 7 and 21 which is closer in the level to the low-frequency component signal 6 than the other. It is because one of the low-frequency component signals 7 and 21 which is closer in the level to the low-frequency component signal 6 than the other can be expected to have the larger correlation with the signal 6 than the other.

Figure 10:
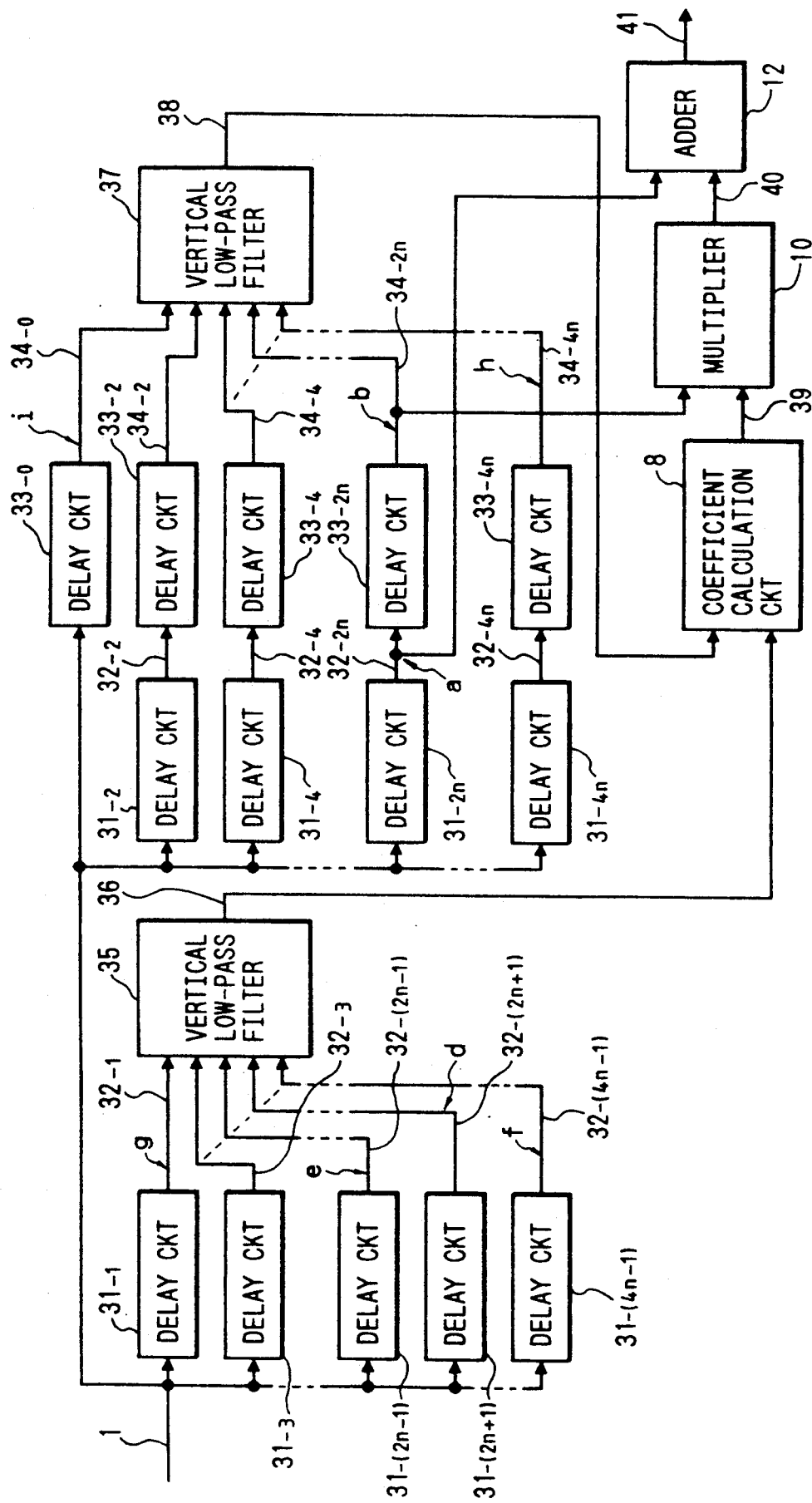

In all the above embodiments, the signal at a sampling point which cannot be obtained at a horizontal scanning period is interpolated by using the vertical correlation with regard to the object. For instance, the signal at point a which cannot be obtained from the first field in FIG. 3 is found by using the signals for the scanning line having point a on it and the signals for the scanning line having point d or e on it. By contrast, there may be a sixth embodiment of the present invention in which an interpolation is made by using the horizontal correlation with regard to the object. To be more specific, the signal at point a can be obtained from the signals for the vertical line having points a, d and e on it and the signals for the vertical line having point b or c on it. This embodiment is shown in FIG. 10. The signal positions on a picture in the embodiment is shown in FIG. 2.

In the embodiment shown in FIG. 10, the input signal 1 is input to delay circuits 31-1, 31-2, ..., 31-2n, ..., 31-4n in order to obtain delayed signals 32-1, 32-2, ..., 32-2n, ..., 32-4n. The delay time provided by the delay circuits 31-1, 31-2, ..., 31-2n, ..., 31-4n is one horizontal scanning period, two horizontal scanning periods, ..., 2n horizontal scanning periods, ..., 4n horizontal scanning periods respectively. The input signal 1 and the delayed signals 32-2, ..., 32-2n, ..., 32-4n are then input to delay circuits 33-0, 33-2, ..., 33-2n, ..., 33-4n whose delay time is half of the sampling period in order to obtain delayed signals 34-0, 34-2, ..., 34-2n, ..., 34-4n. As a result of the above, when the delayed signal 32-2n output from the delay circuit 31-2n is a time base signal and so is a signal corresponding to point a on the picture shown in FIG. 2, the delayed signal 34-2n is a signal corresponding to point b, and delayed signals 32-(2n−1) and 32-(2n+1) are signals corresponding to points e and d respectively. Further, delayed signals 32-(4n−1) and 32-1 correspond to points f and g on the vertical line having the point a on it respectively. The delayed signals 34-0 and 34-4n correspond to points i and h on the vertical line having the point b on it respectively.

Figure 2:
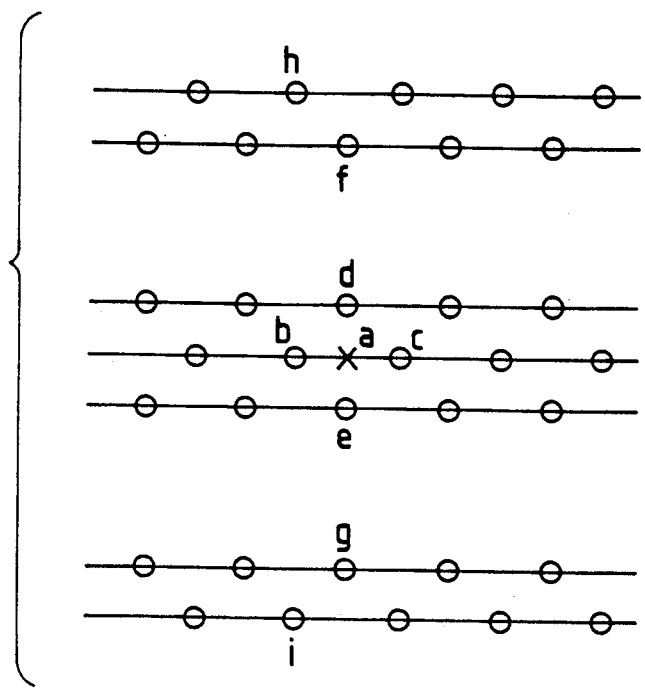
FIG. 2 is a view showing the positions of examples of sampling points (picture elements whose signals are sampled) in a one-field image which are to be used for interpolation in embodiments of the present invention.
Figure 3:
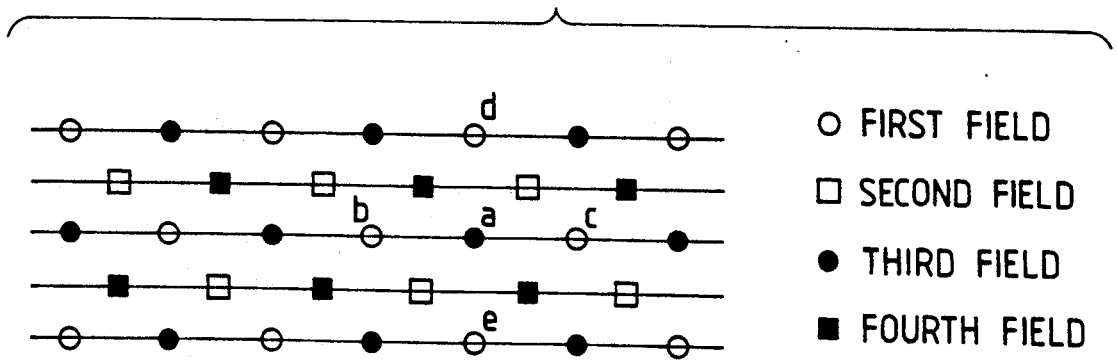
FIG. 3 is a view of sampling points being interleaved in a picture.

As a result, input of the delayed signals 32-1, 32-3, ..., 32-(2n - 1), ..., 32-(4n−1), ..., 32-(4n−1) to a vertical low-pass filter 35 causes the filter 35 to output a vertical low-frequency component signal 36, which is the low-frequency components of the vertical frequency spectra for signals for the vertical line having on it point a shown in FIG. 2. In the same fashion, input of the delayed signals 34-0, 34-2, ..., 34-2n, ..., 34-4n to a vertical low-pass filter 37 causes the filter 37 to output a vertical low-frequency component signal 38, which is the low-frequency components of the vertical frequency spectra for signals for the vertical line having point b on it. Then, the vertical low-frequency component signals 36 and 38 are input to a coefficient calculation circuit 8 in order to obtain a coefficient signal 39 representing a coefficient equal to a ratio of a level of the vertical low-frequency component signal 36 to that of the vertical low-frequency component signal 38 (level of signal 36/level of signal 38). The coefficient signal 39 and also the delayed signal 34-2n from the delay circuit 33-2n which corresponds to point b are input to a multiplier 10. The multiplier 10 multiplies the level of the latter by that of the former to issue an interpolation signal 40. The interpolation signal 40 is then input to the adder 12 together with the delayed signal 32-2n which, output from the delay circuit 31-2n, is the time base signal corresponding to the point a.

Thus, in the embodiment shown in FIG. 10, it is possible to interpolate the signal at the point a on the picture shown in FIG. 2 by using the relation between the signals for the vertical line having the point a on it and the signals for the vertical line having the point b on it. This embodiment shown in FIG. 10 also has the same effects as those taken on by the embodiment shown in FIG. 1. This will be obvious when the object is considered as that turned 90°.

It will also be obvious that a seventh embodiment of the present invention which uses the signals for the vertical line having on it point c shown in FIG. 2 is feasible just in the same way as the embodiment shown in FIG. 7 has been deduced earlier from the embodiment shown in FIG. 1. Another embodiment will be feasible in which an interpolation is made by using both the signals for the vertical line having point b on it and the signals for the vertical line having point c on it. A further embodiment will be feasible in which the embodiment in FIG. 1 and that shown in FIG. 10 are combined. A still further embodiment will be possible in which an interpolation is made by using an tilted line having such a point as b or c rather than a vertical line.

As understood from the above description, with an apparatus for interpolating a video signal according to the present invention, it is possible to remove side band components from frequency spectra of interleaved video signals for adjacent scanning lines and thus to obtain a reproduced picture where no failure signal occurs in the edge portion of the object.

There may also be yet another embodiment of the present invention in which defects of the picture elements of a solid-state image pickup device are eliminated by interpolation by using the signals representing the picture elements around the defective picture elements.

What is claimed is:

1. A method of interpolating a signal corresponding to a picture element to be interpolated comprising the steps of:

obtaining a first signal representing a first picture element which is in a first scanning line including said picture element to be interpolated, and which is adjacent to said picture element to be interpolated;

obtaining a second signal representing a second picture element which is in a second scanning line adjacent to said first scanning line in the same field, and which is adjacent to said picture element to be interpolated;

obtaining a coefficient signal representing a ratio of a level of said first signal of said first scanning line to a level of said second signal of said second scanning line;

multiplying a level of said second signal by said coefficient signal so that the level of said second signal is correlated; and adding the second signal whose level has been corrected to the first signal of said first scanning line as a signal corresponding to said picture element to be interpolated.

2. A method of interpolating a signal corresponding to a picture element to be interpolated comprising the steps of:

obtaining a first signal representing a first picture element which is adjacent to said picture element to be interpolated, and which is in a first scanning line including said picture element to be interpolated;

obtaining a second signal representing a second picture element which is adjacent to said picture element to be interpolated, and which is in a second scanning line adjacent to said first scanning line in the same field;

extracting low-frequency component of a signal of said first scanning line and low-frequency component of a signal of said scanning line, respectively;

obtaining a coefficient signal representing a ratio of a level of the low-frequency components of the signal of said first scanning line to a level of the low-frequency components of the signal of said second scanning line;

multiplying a level of said second signal by said coefficient signal so that the level of said second signal is corrected; and adding the second signal whose level has been corrected to the signal of said first signal scanning line as a signal corresponding to said picture element to be interpolated.

3. An apparatus for interpolating a signal corresponding to a picture element to be interpolated comprising:

a signal source for outputting successively, in the order of the scanning, signals for a plurality of scanning lines forming fields;

delay means for delaying a signal output from said signal source for one horizontal scanning period;

first extraction means for extracting from a signal output from said signal source its low-frequency components;

second extraction means for extracting from a signal output from said delay means its low-frequency components;

calculation means for calculating a coefficient signal representing a ratio of a level of the low-frequency components output from said first extraction means to a level of the low-frequency components output from said second extraction means;

multiplication means for multiplying a level of the signal output from said delay means by said coefficient signal provided by said calculation means; and addition means for adding a signal output from said multiplication means to the signal output from said signal source.

4. An apparatus according to claim 3 wherein said first and second extraction means each are comprised of a low-pass filter.

5. An apparatus for interpolating a signal corresponding to a picture element to be interpolated comprising:

a signal source for outputting successively, in the order of scanning, signals for a plurality of scanning lines forming fields;

delay means for delaying a signal output from said signal source for one horizontal scanning period;

first extraction means for extracting from a signal output from said signal source its low-frequency components;

second extraction means for extracting from a signal output from said delay means its low-frequency components;

calculation means for calculating a coefficient signal representing a ratio of a level of the low-frequency components output from said second extraction means to a level of the low-frequency components output from said first extraction means;

multiplication means for multiplying a level of the signal output from said signal source by said coefficient signal provided by said calculation means; and addition means for adding a signal output from said multiplication means to the signal output from said delay means.

6. An Apparatus according to claim 5 wherein said first and second extraction means each are comprised of a low-pass filter.

* * * * *